I. C. HOFFMAN.
APPARATUS FOR GRANULATING SLAG.
APPLICATION FILED JUNE 26, 1907.

902,490.

Patented Oct. 27, 1908.

WITNESSES

INVENTOR

UNITED STATES PATENT OFFICE.

ISAAC C. HOFFMAN, OF SOUTH CHICAGO, ILLINOIS.

APPARATUS FOR GRANULATING SLAG.

No. 902,490.　　　Specification of Letters Patent.　　　Patented Oct. 27, 1908.

Application filed June 26, 1907. Serial No. 380,980.

*To all whom it may concern:*

Be it known that I, ISAAC C. HOFFMAN, of South Chicago, Cook county, Illinois, have invented a new and useful Apparatus for Granulating Slag, of which the following is a full, clear, and exact description, reference being had to the accompanying drawings, forming part of this specification, in which—

Figure 1:
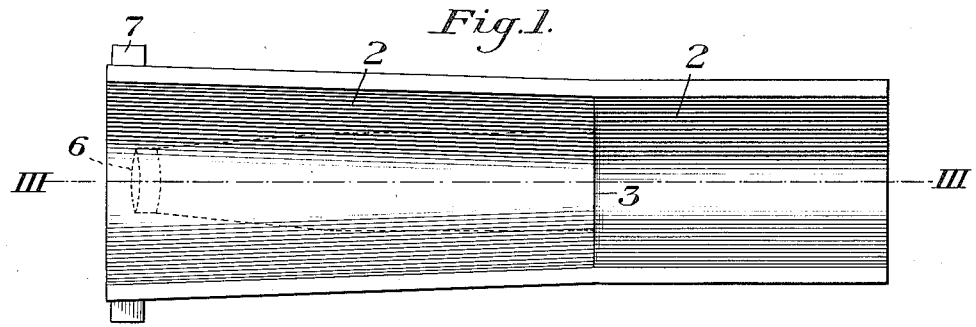
Figure 2:
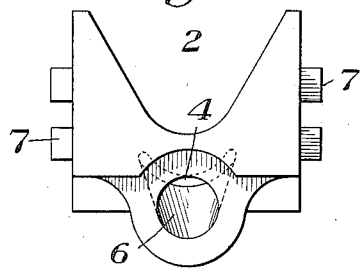
Figure 3:
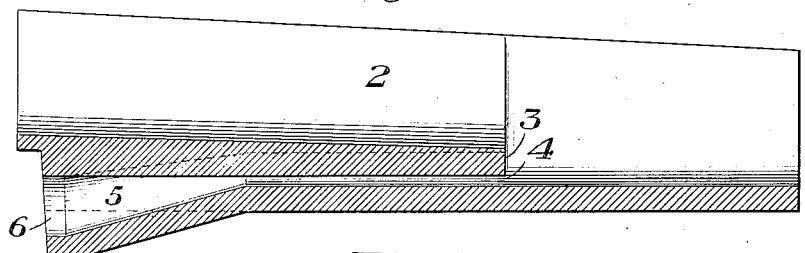
Figure 4:
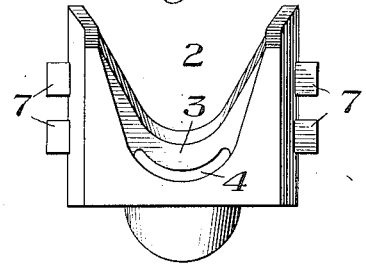

Figure 1 is a plan view of a slag trough or runner constructed in accordance with my invention; Fig. 2 is an end elevation of the front or receiving end of the same; Fig. 3 is a longitudinal cross-section on the line III—III of Fig. 1; and Fig. 4 is an end elevation of the discharging end of the apparatus.

My invention relates to apparatus used in handling molten slag as it is discharged from the slag tapping hole of a blast furnace and it is designed to provide a simple and effective apparatus by the use of which the expense of handling the slag is greatly reduced and the difficulties and dangers heretofore met with are avoided and prevented.

Heretofore in apparatus employed for granulating slag, the slag has been run into a large tank or pool of water or the slag has been brought into contact with water within an inclosing chamber or tube. The first of these devices necessitates handling in removing the slag from the tank to the cars for shipment, while the use of the inclosed chamber or tube results in frequent explosions, with great liability of damage to surrounding property, expensive delays and possible injury and loss of life to the operatives. In order to overcome these difficulties and dangers I employ an open metal trough in which the molten slag is brought into contact with water so as to effectually granulate it. Preferably the section of trough in which the water is introduced, is located so as to project over a track so as to deliver the granulated slag into a car or cars which are placed in position on the track. Instead of this arrangement, the trough section containing the water supply outlet may be located at any desired point in the length of the slag runner.

In the drawings 2 represents the preferred form of construction of the slag trough. The bottom of the inside of the trough is provided with a step or offset 3 at about the middle of its length and a water outlet 4 which is preferably a narrow slot opens into the trough 2 through the vertical wall formed by this step or offset. The slot 4 is connected by the channel or conduit 5 with a suitably shaped outlet opening 6, this outlet being connected by a suitable pipe and flange to a source of water supply. Provision for securing the trough to the next section is made by means of suitable lugs or ears 7.

In the operation of the apparatus, the water is turned on and flows down the trough under considerable pressure from the water outlet slot. The molten slag is then caused to flow down the slag runner and as it flows over the offset 3 comes into contact with the water. The slag is instantly disintegrated and formed into a fine sharp sand which can be used as a substitute for ordinary river or pit sand for building purposes, without further treatment. The disintegrated slag is washed down the slag trough by the water and is discharged from the trough directly into cars in a cool condition and is then ready for shipment.

The advantages of my invention will be apparent to those skilled in the art. The danger of explosions and consequent damage to surrounding property is entirely removed, one handling operation of the slag is rendered unnecessary resulting in less expense in disposing of the molten slag. The slag is disintegrated into a fine sharp sand which is easily disposed of as it is in condition to be used for various purposes without further treatment.

The apparatus is simple and not liable to get out of order.

Many changes in the form and arrangement of the trough may be made without departing from my invention.

I claim:—

1. Apparatus for granulating molten slag comprising an open metal trough having its bottom surface in two substantially parallel planes with a step or off-set intermediate of its ends, and a water supply channel located in the bottom of said trough and having its discharge end terminating in a vertical wall forming the step or off-set, the supply channel being flattened to form a discharge opening wide in one dimension and relatively thin transversely; substantially as described.

2. Apparatus for granulating molten slag comprising an open metal trough having its bottom surface in two substantially parallel planes with a step or off-set intermediate of its ends, and a water supply channel located in the bottom of said trough and having its discharge end terminating in a vertical wall forming the step or off-set, the supply channel being flattened to form a discharge opening in one dimension and relatively thin transversely, the bottom wall of the flattened discharge opening being in the same horizontal plane as the bottom of the discharge end of the trough; substantially as described.

3. Apparatus for granulating molten slag comprising an open metal trough having upwardly and outwardly inclined sides connected by a curved bottom portion, the bottom surface of the trough being in two substantially parallel planes with a step or offset intermediate its ends and with a water supply channel in the trough having its discharge end terminating in a vertical wall forming the step or off-set, the supply channel being flattened to form a discharge opening wide in one dimension and relatively thin transversely, the bottom of the flattened discharge opening being in the same curved plane as the bottom of the discharge end of the trough; substantially as described.

In testimony whereof, I have hereunto set my hand.

ISAAC C. HOFFMAN.

Witnesses:
ROBERT M. CUTTING,
NICHOLAS F. REFEWICZ.